Nov. 3, 1953 E. S. SKORR 2,657,492
FISHING ROD MOUNT AND ACTUATOR
Filed July 9, 1951 2 Sheets-Sheet 1

Inventor
ELMER STANLEY SKORR
Attorney

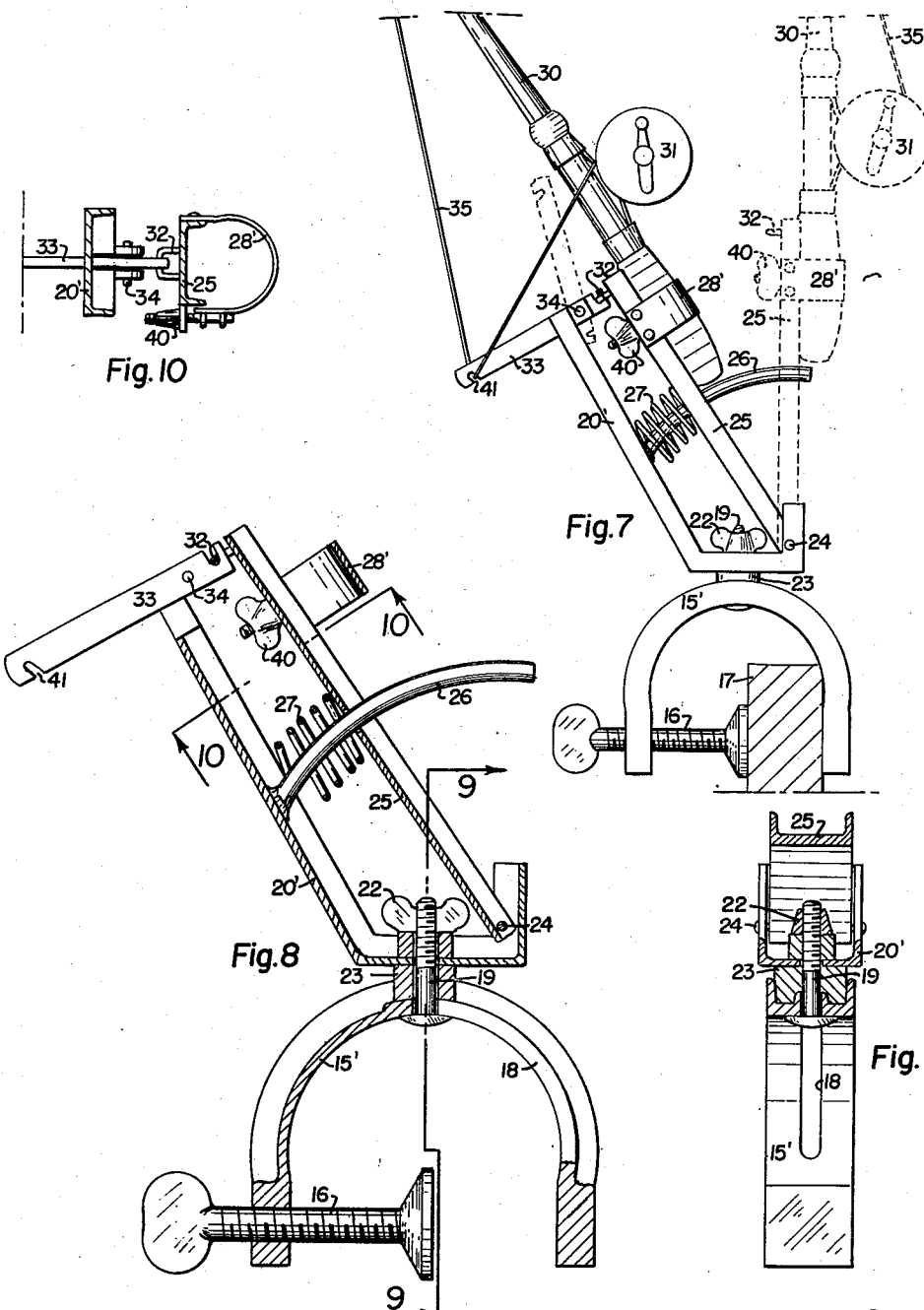

Patented Nov. 3, 1953

2,657,492

UNITED STATES PATENT OFFICE 2,657,492

FISHING ROD MOUNT AND ACTUATOR

Elmer Stanley Skorr, Colman, S. Dak.

Application July 9, 1951, Serial No. 235,767

1 Claim. (Cl. 43—15)

This invention relates to the art and practice of angling, and more particularly to adjuncts facilitative of such art and practice, and has as an object to provide an improved fishing rod mount and actuator for operative association with conventional angling equipment.

A further object of the invention is to provide an improved fishing rod mount and actuator adapted to operatively support conventional angling equipment in position of use and to automatically actuate such equipment in reaction to the "bite" of a fish.

A further object of the invention is to provide an improved fishing rod mount and actuator arranged for mounted association with and in variously-adjustable fixed relation upon commonly-available supports of diverse types and dispositions.

A further object of the invention is to provide an improved fishing rod mount and actuator adapted to cooperatively receive and actuate conventional angling equipment of various types and constructions.

A further object of the invention is to provide an improved construction and interassociation of elements constituting a fishing rod mount and actuator.

A further object of the invention is to provide improved means for triggering a fishing rod mount and actuator for automatic rod-actuating reaction to the "bite" of a fish.

A further object of the invention is to provide an improved fishing rod mount and actuator that is simple and inexpensive of manufacture, compact and convenient of form, of high use adaptability, positive and effective in operation, and enhancive of the pleasures and benefits incident to angling.

With the foregoing and other objects in view, my invention consists in the construction, arrangement, and combination of elements as hereinafter set forth, pointed out in my claim, and illustrated by the accompanying drawings, in which—

Figure 1:
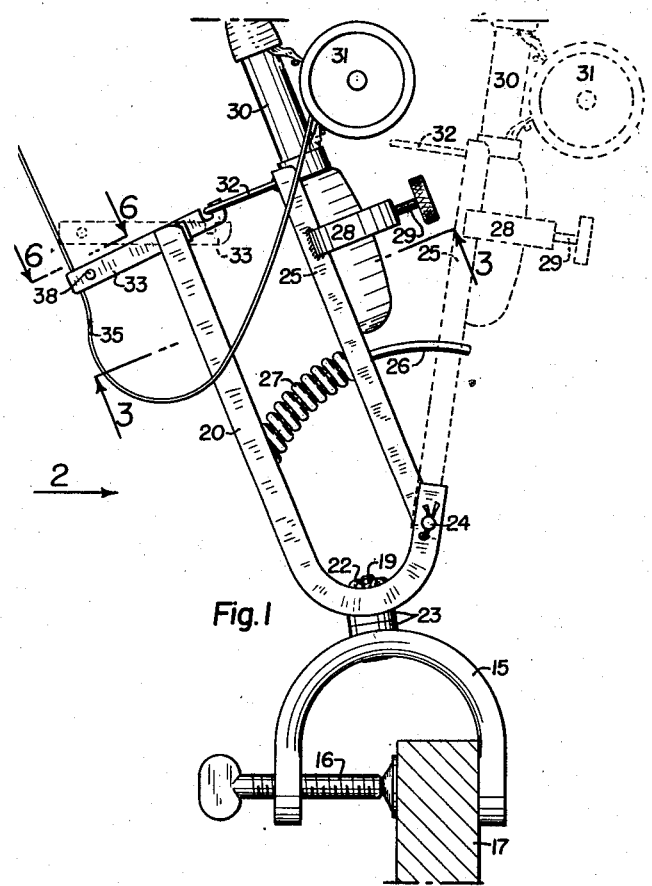
Figure 2:
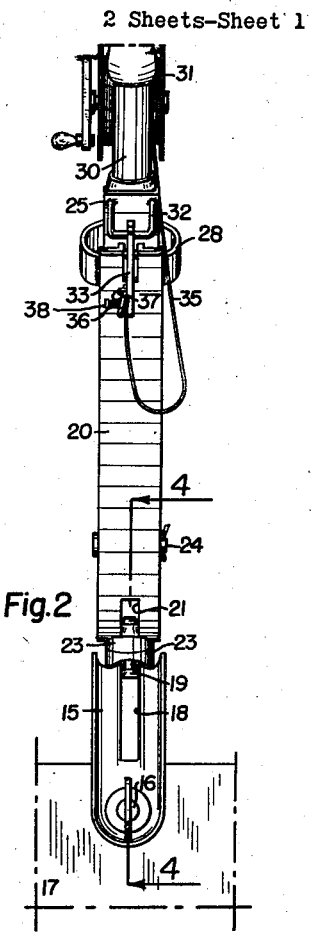
Figures 3, 4:
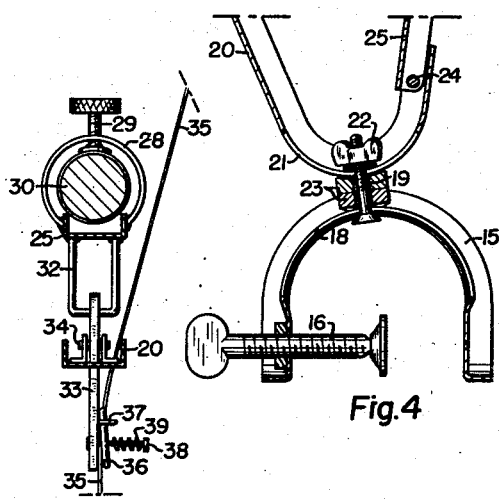
Figure 5:
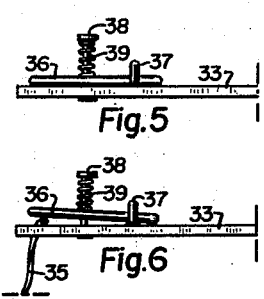
Figure 6:
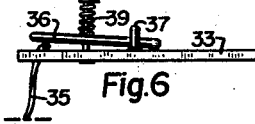

Figure 1 is a side elevation of a preferred embodiment of the invention in one of its positions of practical use, portions of associated features not essential to an understanding of the invention being broken away to conserve space and alternative positions for certain movable elements of the improvement being indicated by broken lines. Figure 2 is an elevation of the organization according to Figure 1 at right angles to said latter view and as seen from the left thereof. Figure 3 is a fragmentary, detail section taken substantially on the indicated line 3—3 of Figure 1. Figure 4 is a fragmentary, detail section taken substantially on the indicated line 4—4 of Figure 2. Figure 5 is a fragmentary, detail elevation, on an enlarged scale, of a trigger and line clip arrangement utilized in the organization according to the preceding views. Figure 6 is a view similar to Figure 5 with a line clipped to the trigger element of the arrangement. Figure 7 is a side elevational showing, similar to Figure 1, of an alternative embodiment of the invention. Figure 8 is a section, on an enlarged scale, taken substantially on the vertical median plane of the assembly according to Figure 7. Figure 9 is a fragmentary, detail section taken on the indicated line 9—9 of Figure 8. Figure 10 is a fragmentary, detail section taken on the indicated line 10—10 of Figure 8.

When fishing with the usual reel-equipped rod and line, it is frequently desirable to support and fix the rod in appropriate position of use in an arrangement automatically effective to hook a fish nibbling or biting on the associated lure, and the instant invention is directed to the provision of a novel and improved device employable in clamped relation with any convenient support to mount a conventional rod in a desired use position and to actuate the rod for automatic hooking of a fish attacking the lure line engaged with such rod.

As shown in Figures 1-6 of the drawings, a U-shaped clamp is formed from a channeled strip 15 of suitable rigid material bent to bring the strip ends into opposition and to concave the web of the strip channel at the inside of the unit with the channel flanges convexly outstanding therefrom and a stem 16 threadedly engaged through one of the strip ends to adjustably span between said ends in a usual manner and arrangement effective to provide a mounting member engageable over and in secure clamped relation with the upper strake or thwart of a boat, deck, rail, or frame members of a pier, or any convenient analogous fixed member typified at 17. The arcuate web of the strip 15 is longitudinally slotted, as at 18, to slidably accommodate a headed bolt 19 therein disposed to outstand from and radially of the arched strip portion with its head bearing against the inner, or concave, face of the strip web, and a J-shaped member 20, preferably of rigid channel strip material, is formed with a slot 21 longitudinally intersecting the web of its hook, or arcuate portion, wherethrough the threaded end of the bolt 19 freely and slidably engages to coaction with a wing nut 22 on the concave side of the member 20 hook, thus to adjustably mount the member 20 on and in extension of its major length away from the clamp strip 15 with the convex zones of said strip and member in opposition. Blocks or washers 23 are received on the bolt 19 between adjacent web areas of the strip 15 and member 20 in such face conformation as will appropriately seat the web areas thereby engaged and provide a swivel bearing therebetween, so that manipulation of the nut 22 may operate to firmly clamp the strip 15, member 20, and blocks 23 together in any selected position of bolt 19 adjustment along the slot 18 of the strip 15, of member 20 major length inclination relative to the axis of said bolt, and of angular relation between the planes of said strip and member about the bolt axis as a pivot. By virtue of the arrangement shown and described, the mounting clamp 15—16 may be engaged with any available member 17 fixed in virtually any position and the member 20 then may be adjusted and shifted relative thereto and ultimately secured through the agency of the bolt 19 and nut 22 to incline upwardly and outwardly from the clamp in a selected appropriate position of use.

Hinged at one of its ends to and by means of a pin 24 traversing the member 20 flanges inwardly adjacent the end of the member shorter arm, a straight, rigid, channel strip 25 is mounted to oscillate in the plane of said member toward and away from the major length arm of the latter; said strip 25 preferably engaging between the flanges of the member 20 shorter arm with the strip channel opening outwardly and away from the member major length arm and bearing at one limit of its oscillatory range against the extension of the member shorter arm beyond the pin 24, which extension functions as a stop to limit divergence of said strip 25 relative to the member 20 major length arm. An arcuate finger 26 is secured at one end to the member 20 major length arm and extends thence in the plane of said member to slidable intersection with the web of the strip 25 in a length sufficient to maintain its engagement through said strip when the latter is at the outward limit of its oscillatory range, and an expansive coil spring 27 on and about said finger between the member 20 major length arm and the strip 25 yieldably urges said strip to the outward limit of its oscillation and to a normal position of maximum divergence from the member arm indicated by broken lines in Figure 1. The strip 25 is adapted to mount and support a conventional fishing rod in position of use, for which purpose a loop yoke 28 is fixed to outstand laterally from, and to bridge the channel of, said strip inwardly adjacent the strip free end and carries a clamp screw 29 adjustable into and out of engagement with the handle, or butt end, of a conventional rod 30 entered through the yoke 28 to lie against, and in alignment with, the strip 25, thereby to secure said rod to and for travel with the strip 25 with the usual reel 31 carried by the rod disposed outwardly adjacent the strip free end.

Fixed to the free end of the strip 25 and projecting laterally thence toward the end of the member 20 major length arm, a latch element 32, conveniently in the form of an eye or loop, is disposed to align at times with a latch bar 33 hinged, as at 34, to the free end of the member 20 major length arm for oscillation in the plane of said member about an axis paralleling that of the pin 24 and, when so aligned, to engage with an upwardly and outwardly opening notch in the adjacent end of said latch bar for retention of the strip 25, and its associated rod 30, against the pressure of the spring 27 in substantial parallelism with the member 20 major length arm and to hold latch bar 33 aligned and engaged with said element 32 in substantially perpendicular relation with its mounting arm, as indicated by full lines in Figure 1, thus to mount and support the rod 30 in position of practical use.

A feature of the invention being release of the latched relation between the element 32 and bar 33 for consequent spring-urged actuation of the strip 25 and associated rod 30 in reaction to the "bite" of a fish on the bait or lure of the rig carried by the rod 30, thereby to automatically hook the biter, a slack bight of the rig line 35 is developed between the reel 31 and next-adjacent line guide of the rod and said bight is releasably clipped to the outer end of the bar 33 in a manner to reflect any tug on the hook end of the line as an upward oscillation of the bar free end to a position, broken lines in Figure 1, wherein the notch at the other end of said bar is disengaged from the element 32 and the strip 25 is freed to react to pressure of the spring 27; further tensioning of the line 35 in reaction to fish action or rod tip oscillation operating to release the line from its engagement with the latch bar and thus put the reel 31 in play. A practical and convenient means for releasably clipping the line 35 to the free end of the bar 33 is illustrated as a rod 36 paralleling and loosely against one side of the latch bar 33 with a smoothly-rounded end adjacent the latch bar free end, a keeper 37 loosely restraining the inner end of said rod, a headed stem 38 fixedly outstanding laterally from the bar 33 through a midportion of said rod, and an expansive coil spring 39 on and about said stem between said rod and the stem head to yieldably urge the said rod against the bar. Thus, when the line 35 is slipped under the rounded end of the rod 36, the pressure of the spring 39 operates to clamp the line against the side of the bar 33 with moderate force sufficient to actuate the latch bar for release of the element 32 when a fish tugs at the line in biting at the lure or bait, but without adequate force to hold the line to the bar after such release gives occasion for greater stresses on the line.

The alternative embodiment of the invention represented by Figures 7–10, inclusive, of the drawings is the functional equivalent of the organization shown in the preceding views and hereinabove described and differs from such initial disclosure only in certain details of structure. In the modified construction, a somewhat heavier clamp element 15', perhaps of cast or forged fabrication, is shown in substitution for the channel strip 15 and is provided with a longitudinal slot 18 shorter than the corresponding feature of said strip; the member 20 is replaced by a member 20' angularly, instead of arcuately, conformed to present a flat attachment area to the associated clamp for coaction with a single block 23 to effect the desired adjustable mounting thereof on said clamp; a flexible strip yoke 28' is substituted for the loop yoke 28 in an adjustable connection of one of its ends with a wing nut 40 through an ear at one side of the strip 25, thereby to mount the rod 30 on the said strip 25 through direct clamping action of the strip yoke 28' against the rod grip or butt, instead of through the agency of the clamp screw 29; and the line clip 36—39 is discarded in favor of a laterally and downwardly opening notch 41 in the free end of the latch bar 33 in and through which the bight of the line 35 may be hooked, as in Figure 7, to trigger the device for automatic reaction to the "bite" of a fish in the manner hereinbefore set forth.

Without elaboration as the detailed manner of its use, it should be readily apparent that the improvement provides a desirable adjunct conveniently employable in association with commonly available fixed supports to operatively mount and position conventional fishing rigs in areas and attitudes of their use and to automatically actuate a so-positioned rig for hooking of a fish that attacks the associated lure or bait.

Since changes, variations, and modifications in the particular form, construction, and arrangement of the elements shown and described may be had without departing from the spirit of my invention, I wish to be understood as being limited solely by the scope of the appended claim, rather than by any details of the illustrative showing and foregoing description.

I claim as my invention:

A support for a fishing rod comprising a J-shaped bracket having a long arm and a short arm and having means at the base of the bracket for securing the same to a support, the long arm of the bracket having an arcuate guide intermediate the ends thereof, a member normally substantially parallel to the long arm and pivoted to the short arm of the bracket and having an opening intermediate the ends thereof for receiving the guide therein, a spring surrounding the guide and located between the long arm of the bracket and the member and adapted to urge the member to a position out of parallelism with said long arm, said member having a loop at the opposite end thereof and a fishing rod clamp intermediate the ends thereof, and a latch pivoted intermediate its ends to a free end of the long arm of the bracket and having notches on opposite sides in the edges thereof, one of said notches adapted to engage the loop to hold the member in substantially parallel relation to the long arm, and the other of said notches adapted to receive a portion of a fishing line of a fishing rod secured in the clamp, whereby a pull on the line will cause the latch to swing and release the member to permit the spring to move it to a position out of parallelism with said long arm.

ELMER STANLEY SKORR.

References Cited in the file of this patent

UNITED STATES PATENTS

| Number | Name | Date |
|---|---|---|
| 693,071 | Ruud | Feb. 11, 1902 |
| 975,822 | Becker et al. | Nov. 15, 1910 |
| 1,252,727 | Sedlin | Jan. 8, 1918 |
| 1,957,853 | Sibley | May 8, 1934 |
| 1,992,165 | Bardon | Feb. 26, 1935 |
| 2,089,715 | Simmons | Aug. 10, 1937 |
| 2,295,250 | Zenewich | Sept. 8, 1942 |
| 2,340,588 | Groves | Feb. 1, 1944 |
| 2,473,778 | Benes | June 21, 1949 |
| 2,489,974 | Norelius | Nov. 29, 1949 |

FOREIGN PATENTS

| Number | Country | Date |
|---|---|---|
| 984,278 | France | Feb. 12, 1951 |